(12) United States Patent
Bhattacharjee et al.

(10) Patent No.: US 7,937,541 B2
(45) Date of Patent: May 3, 2011

(54) SPEED SELECTIVE TABLE SCAN OPERATION

(75) Inventors: Bishwaranjan Bhattacharjee, Yorktown Heights, NY (US); Christian A. Lang, New York, NY (US); Timothy R. Malkemus, Round Rock, TX (US); Sriram Padmanabhan, San Jose, CA (US); Kwai Wong, Sunderland (CA)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 11/548,889

(22) Filed: Oct. 12, 2006

(65) Prior Publication Data

US 2008/0091908 A1    Apr. 17, 2008

(51) Int. Cl.
G06F 12/06    (2006.01)

(52) U.S. Cl. .................................. 711/154; 711/E12.014

(58) Field of Classification Search ............ 711/E12.014
See application file for complete search history.

(56) References Cited

U.S. PATENT DOCUMENTS

| | | | |
|---|---|---|---|
| 6,339,811 B1 * | 1/2002 | Gaertner et al. | 711/112 |
| 6,691,218 B2 * | 2/2004 | Brown | 711/216 |
| 7,185,168 B2 * | 2/2007 | Rudeseal et al. | 711/173 |
| 7,526,603 B1 * | 4/2009 | Abdollahi-Alibeik et al. | 711/108 |
| 2002/0194149 A1 * | 12/2002 | Gerber et al. | 707/1 |
| 2004/0088478 A1 * | 5/2004 | Hall | 711/112 |
| 2005/0268028 A1 * | 12/2005 | Mukherjee | 711/108 |

OTHER PUBLICATIONS

Harizopoulos, et al.,"QPipe: A Simultaneously Pipelined Relational Query Engine", pp. 383-394.
R. Bhashyam, "TPC-D—The Challenges, Issues and Results", SIGMOD Record, vol. 25, No. 4, Dec. 1996, pp. 89-93.

* cited by examiner

Primary Examiner — Matt Kim
Assistant Examiner — Ryan Dare
(74) Attorney, Agent, or Firm — Jon A. Gibbons; Fleit Gibbons Gutman Bongini & Bianco PL

(57) ABSTRACT

Disclosed are a method, information processing system, and computer readable medium for scanning a storage medium table. The method includes retrieving location information associated with at least one other storage medium table scan. A storage medium table scan is started at a location within a storage medium table based on at least a location of the one other storage medium table scan. A weight is assigned to at least one storage medium block based on at least a current scanning location within the storage medium table relative to the location of the one other table scan. The method determines if a distance between the current scanning location and the location of the one other table scan is greater than a first given threshold. A current scanning operation is delayed, in response to the distance being greater than the given threshold, until the distance is below a second given threshold.

15 Claims, 10 Drawing Sheets

SPEED SELECTIVE TABLE SCAN OPERATION

RELATED APPLICATION(S)

This application is related to U.S. patent application Ser. No. 11/548,875, filed on Oct. 12, 2006, entitled "Increasing Buffer Locality During Multiple Table Access Operations", the entire contents of which are incorporated herein by reference.

FIELD OF THE INVENTION

The present invention generally relates to the field of data accessing, and more particularly relates to managing multiple table scan operations.

BACKGROUND OF THE INVENTION

Different techniques have been proposed for increasing cache locality for various workloads. One of the oldest and most basic algorithms is the least recently used ("LRU") algorithm. The LRU algorithm evicts the page from the cache that was not accessed the longest. LRU is currently the policy of choice in many database systems due to its small overhead and tuning-free operation. Many variants of LRU have been proposed since. One example is LRU-K, as described in "The LRU-K page replacement algorithm for database disk buffering" E. J. O'Neil, P. E. O'Neil, and G. Weikum, In Proc. ACM SIGMOD Int. Conf. on Management of Data, pages 297-306, which is hereby incorporated by reference in its entirety. LRU-K evicts the page whose Kth most recent access is the longest in the past.

Another example, is 2Q as described in "2Q: A low overhead high performance buffer management replacement algorithm", T. Johnson and D. Shasha, In Proc. Int. Conf. on Very Large Data Bases, pages 439-450, 1994, which is hereby incorporated by reference in its entirety. 2Q reduces LRU-K's logarithmic overhead to a constant overhead LFU is another example and is discussed in "Data cache management using frequency-based replacement", J. Robinson and M. Devarakonda, In Proc. ACM SIGMETRICS Conf., pages 134-142, 1990, which is hereby incorporated by reference in its entirety. LFU evicts the page that was accessed least frequently. Hybrids have also been introduced such as LRFU, which combines LRU and LFU and ARC, which can adaptively switch between different eviction policies. LRU is further discussed in "LRFU: A spectrum of policies that subsumes the least recently used and least frequently used policies", Lee, J. Choi, J.-H. Kim, S. H. Noh, S. L. Min, Y. Cho, and C. S. Kim. IEEE Trans. Computers, 50(12):1352-1360, 2001 and ARC is further discussed in "Outperforming LRU with an adaptive replacement cache", N. Megiddo and D. Modha, 2004, which are bother hereby incorporated by reference in their entirety.

L. Belady in "A study of replacement algorithms for virtual storage computers", IBM Systems Journal, 5(2):78-101, 1966, which is hereby incorporated by reference in its entirety, gives an optimal offline algorithm, MIN, for the cache replacement problem which evicts the page that is accessed the farthest in the future. All these techniques given above are for general access patterns. In other words, they are not directed towards sequential or ordered access patterns. Therefore, they do not provide an improved buffer utilization for this specific type of access.

Commercial database vendors such as Red Brick and Teradata employ proprietary algorithms to let the database synchronize multiple table scan operations in order to maximize buffer locality. See for example, "Red brick warehouse: a read-mostly RDBMS for open SMP platforms", P. M. Fernandez, In Proc. ACM SIGMOD Int. Conf. on Management of Data, page 492, 1994; "Explaining cache—NCR CTO Todd Walter answers your trickiest questions on Teradata's caching functionality", T. Walter, http://www.teradata.com/t/page/116344/; and, "TPC-D—The Challenges, Issues and Results", R. Bhashyam, NCR Corporation, SIGMOD Record 25(4) 1996: 89-93, which are hereby incorporated by reference in their entireties.

This idea was taken even further in "A simultaneously pipelined relational query engine", S. Harizopoulos, V. Shkapenyuk, and A. Ailamaki. QPipe, In Proc. ACM SIGMOD Int. Conf. on Management of Data, pages 383-394, 2005, which is hereby incorporated by reference in its entirety. Harizopoulos et al. proposes ideas for a new database architecture that tries to maximize reuse of partial query results from the query down to the page access level. This is achieved by detecting overlaps in active query plan operators at query execution time and then exploiting it by pipelining one operator's results to all dependent operators where possible. Two of the operators discussed in that paper are the table and index scan operators. For these, Harizopoulos et al. proposes to use one scan thread that keeps scanning all pages while table scan operators can attach to and detach from this thread in order to share the scanned pages. While this approach works well for scans with similar speeds, in practice scan speeds can vary by large margins and even single scans' speeds are usually far from constant due to changes in predicate evaluation overhead. Therefore, the benefit can be lower as scans may start drifting apart.

In addition to cache or page buffer algorithm improvements, other methods to reduce disk access costs for multiple concurrent queries with overlapping data accesses have been investigated. These methods include multi-query optimization that requires all queries to be known in advance. See for example, "Efficient and extensible algorithms for multi query optimization", P. Roy, S. Seshadri, S. Sudarshan, and S. Bhobe, In Proc. ACM SIGMOD Int. Conf. on Management of Data, pages 249-260, 2000, which is hereby incorporated by reference in its entirety. These methods also include query result caching "Dynamic caching of query results for decision support systems", J. Shim, P. Scheuermann, and R. Vingralek, In Proc. Int. Conf. on Scientific and Statistical Database Management, pages 254-263, 1999, which is hereby incorporated by reference in its entirety. Due to being at a high level of the query execution hierarchy, the latter may miss out on sharing potential for queries that have very different predicates but still end up performing table scans on the same table, for example.

"Cooperative Scans", M. Zukowski, P. A. Boncz, M. L. Kersten, CWI Report 2004, INS-E0411, ISSN 1386-368, which is hereby incorporated by reference in its entirety introduces a smart buffer manager that is used to optimize page replacement under multiple running queries in order to maximize buffer locality. However, this approach requires significant modifications of the caching system. This invention, on the other hand, views the caching system as a "black box" and limits modifications to a few extra function calls in the scan code.

Therefore a need exists to overcome the problems with the prior art as discussed above.

SUMMARY OF THE INVENTION

Briefly, in accordance with the present invention, disclosed are a method, information processing stream, and computer readable medium for scanning a storage medium table. The method includes retrieving location information associated with at least one other storage medium table scan. A storage medium table scan is started at a location within a storage medium table based on at least a location of the at least one other storage medium table scan. A weight is assigned to at least one storage medium block within the storage medium table based on at least a current scanning location within the storage medium table relative to the location of the at least one other storage medium table scan. The method determines if a distance between the current scanning location and the location of the at least one other storage medium table scan is greater than a first given threshold. A current scanning operation is delayed, in response to the distance being greater than the given threshold, until the distance is below a second given threshold.

In another embodiment an information processing system including a storage medium table scan module for scanning a storage medium table is disclosed. The information processing system comprises a memory and a processor that is communicatively coupled to the memory. A storage medium table scan module is communicatively coupled to the memory and the processor. The storage medium table scan module is for retrieving location information associated with at least one other storage medium table scan. A storage medium table scan is started at a location within a storage medium table based on at least a location of the at least one other storage medium table scan. A weight is assigned to at least one storage medium block within the storage medium table based on at least a current scanning location within the storage medium table relative to the location of the at least one other storage medium table scan. The method determines if a distance between the current scanning location and the location of the at least one other storage medium table scan is greater than a first given threshold. A current scanning operation is delayed, in response to the distance being greater than the given threshold, until the distance is below a second given threshold.

In yet another embodiment, a computer readable medium for scanning a storage medium table is disclosed. The computer readable medium comprises instructions for retrieving location information associated with at least one other storage medium table scan. A storage medium table scan is started at a location within a storage medium table based on at least a location of the at least one other storage medium table scan. A weight is assigned to at least one storage medium block within the storage medium table based on at least a current scanning location within the storage medium table relative to the location of the at least one other storage medium table scan. The method determines if a distance between the current scanning location and the location of the at least one other storage medium table scan is greater than a first given threshold. A current scanning operation is delayed, in response to the distance being greater than the given threshold, until the distance is below a second given threshold.

One advantage of the present invention is caching of tables (i.e., loading, retaining, and accessing of table data items in fast memory rather than slow memory) is improved thereby reducing the disk access cost of concurrent queries that involve sequential/ordered one-time table accesses. The present invention provides table scan grouping and table scan throttling. Table scan grouping enables an adaptive way of prioritizing table pages such that scans that follow each other closely are able to share the pages that the front-most scan has brought into fast memory. Scan throttling improves how close the scans of a group stay together and thereby reduces the memory footprint required by the sharing scans. Furthermore, the proposed caching system can be easily integrated in existing database architectures.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The terms sequential one-time table accesses can also be referred to as "(table) scans". The term table data items can be referred to as "(table) pages" or "blocks". The terms slower memory and faster memory can be referred to as "disk" and "cache", respectively. It should also be noted that the present invention is not limited to systems based on disks or using pages to store data.

Distributed Processing System

Figure 1:
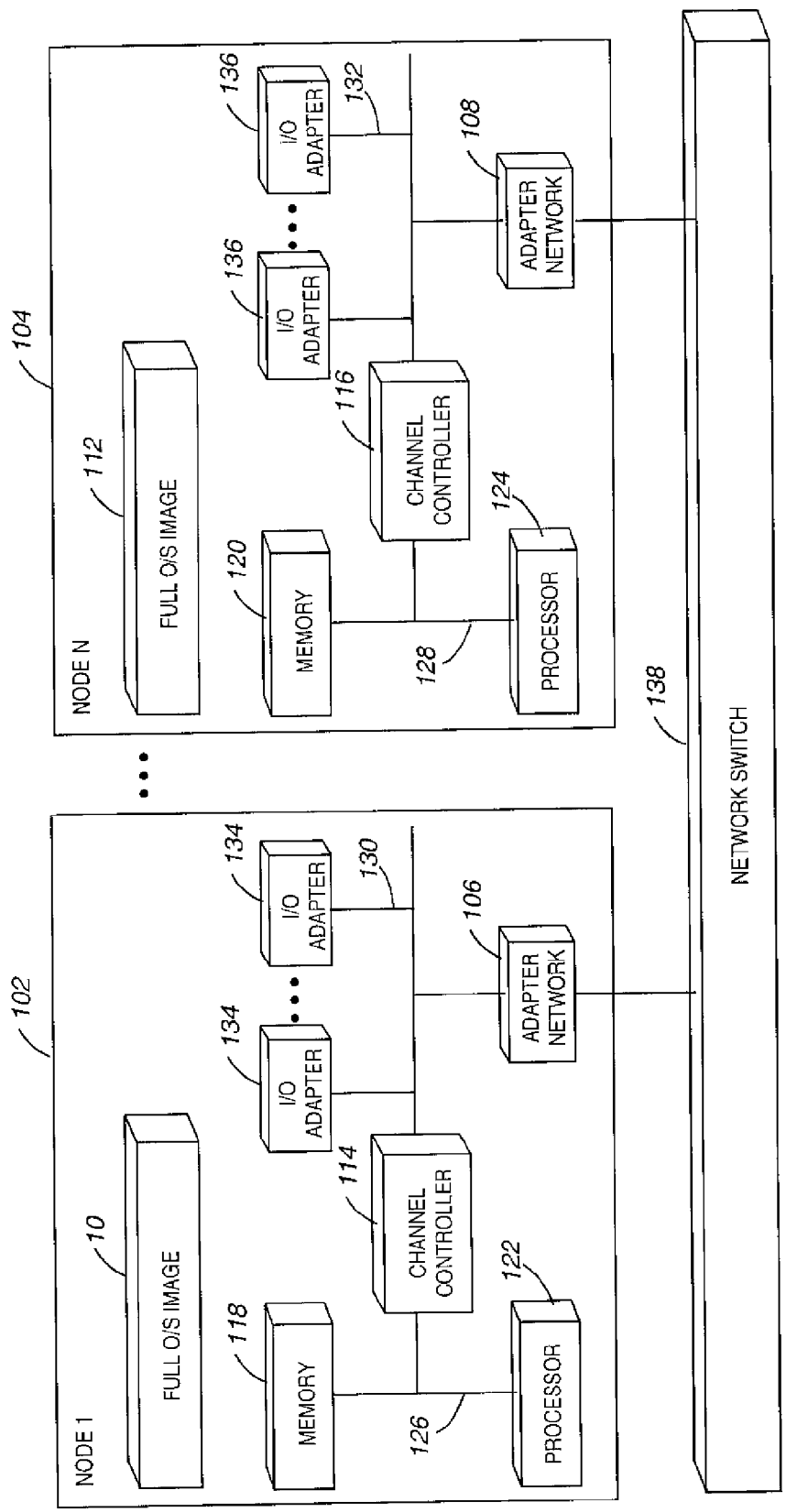
FIG. 1 is a block diagram illustrating a distributed processing system according to an embodiment of the present invention.

According to an embodiment of the present invention, as shown in FIG. 1, an exemplary distributed processing system 100 is shown. In one embodiment, the distributed processing system 100 can operate in an SMP computing environment. The distributed processing system 100 executes on a plurality of processing nodes 102, 104 coupled to one another node via a plurality of network adapters 106, 108. Each processing node 102, 104 is an independent computer with its own operating system image 110, 112, channel controller 114, 116, memory 118, 120, and processor(s) 122, 124 on a system memory bus 126, 128, a system input/output bus 130, 132 couples I/O adapters 134, 136 and network adapter 106, 108. Although only one processor 122, 124 is shown in each processing node 102, 104, each processing node 102, 104 is capable of having more than one processor. Each network adapter is linked together via a network switch 138. In some embodiments, the various processing nodes 102, 104 are able to be part of a processing cluster. All of these variations are considered a part of the claimed invention. It should be noted that the present invention is also applicable to a single information processing system.

Exemplary System Architecture

Figure 2:
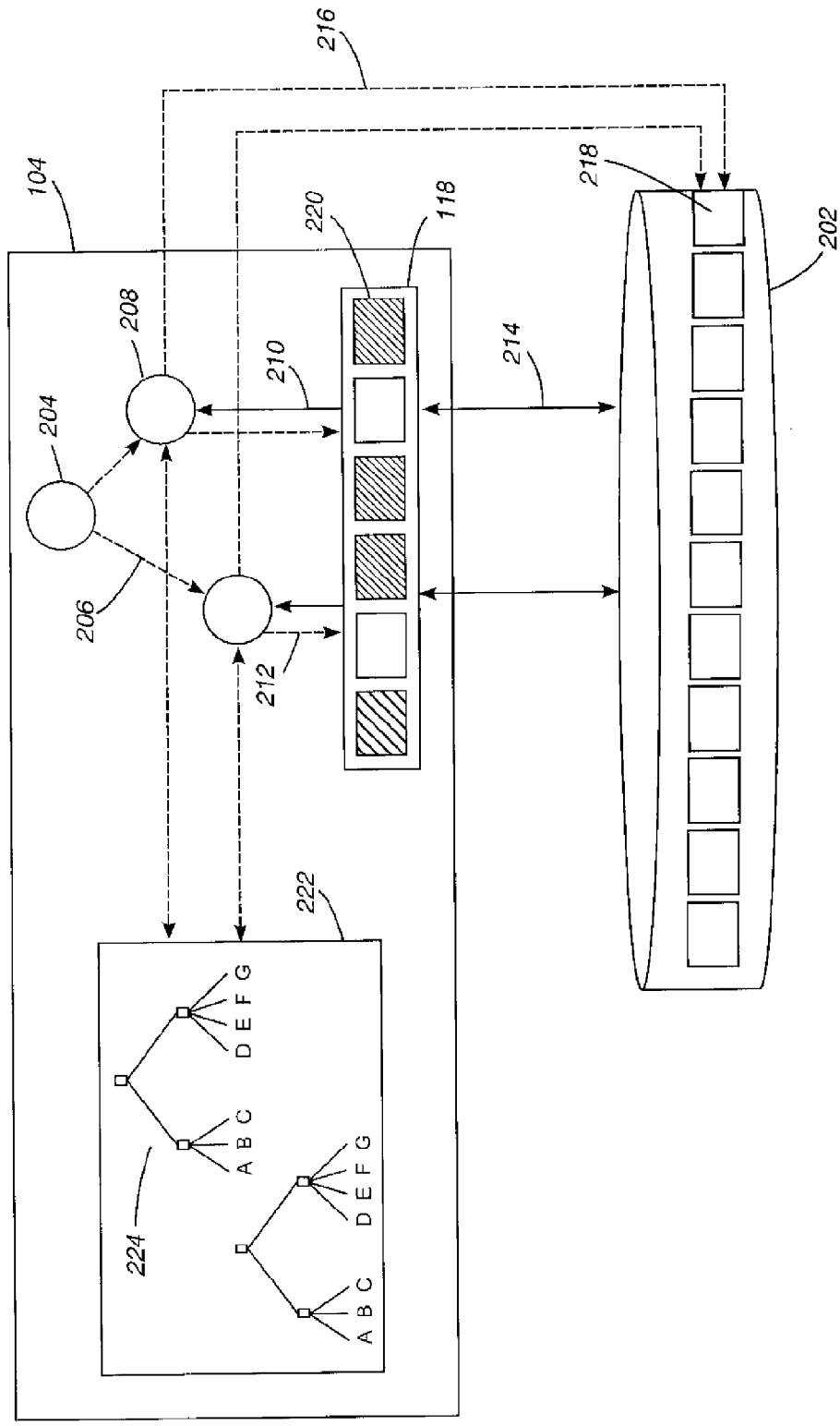
FIG. 2 is a logical flow diagram of the system components of FIG. 1 according to the present invention.

FIG. 2 is a block diagram illustrating an exemplary system architecture according to an embodiment of the present invention. In particular, FIG. 2 shows the logic flow between the various components in a processing node 102 of FIG. 1. It should be noted that the processing node 102 is referred to as "information processing system 102" from hereon in. The system architecture of FIG. 2 is similar to common database architectures. FIG. 2 shows an information processing system 102 that stores programs, data, and runs processes in a fast memory 118 such as RAM and/or cache, and the like. FIG. 2 also shows a storage subsystem 202 that holds the data in a slower but larger storage, typically disks. It should be noted that the storage subsystem 202 can also reside within the information processing system 102.

In one embodiment one or more coordinating processes 204 interpret queries and can spawn 206 table scan processes 208 when necessary. A scan process 208, in one embodiment, is an operation for accessing a set of data items referred to herein as "tables". A table for example, can be a storage medium table such as a disk or memory table. In one example, a scan process 208 is a sequential on-time table access operation ("SOTO"). In one embodiment, database queries or other types of data retrieval operations can be transformed into one or multiple table scan operations and/or additional other operations. In a database system, this is performed, in one embodiment, by transforming a given query into a tree of operators that describes the operations performed and their order. Optimization can also be performed during the transformation phase. A runtime component can then take this operator tree and execute the operations in the order described to obtain the query result. Many such queries and operator trees may be executed at the same time, and therefore many operators such as table scans may run simultaneously on the same underlying tables.

The present invention optimizes the execution of multiple table scan operations by making the scans 208 aware of each other. In typical database systems each scan runs by itself and is not aware of other scans). In one embodiment, each traditional table scan starts reading at the first block of a table and then progresses to each subsequent block until it reaches the last block. While at a block, a scan 208 reads the current block into fast memory 118, performs operations on it, and releases the block when it is done. The current block or page of a scan can be referred to as the location of the scan. Additionally, in one embodiment, a scan 208 can start at a random location x in a table. The scan 208, in this embodiment, reads until the end of the table as described above and then starts from the beginning of the table. The scan 208 then reads forward until the location x (i.e. where the scan 208 was started. A scan 208 that exhibits this behavior can be referred to as a "wrap-around scan" and the action of starting from the beginning of the table as "wrapping around".

The table scan processes 208, in one embodiment, read data 210 out of table pages from the fast memory 118 via "give me page x" calls to the caching subsystem 212. If the caching subsystem 212 has the requested page x, it returns it to the caller. If the caching subsystem 212 does not have the requested page x, the caching subsystem 212 retrieves the page x from the slower storage 202 as shown by the logical flow arrow 214. The scan processes 208 may also request 216 pages ahead of time from the storage 202 in order to have the pages available in the fast memory 118 when needed. This is possible since the scan processes 208, in one embodiment, access the pages or blocks 218 of a table in a sequential/ordered manner and therefore know the pages needed in the near future.

In one embodiment, each data block 220 stored in the fast memory 118 is assigned a priority that indicates how likely the block 220 is to get removed from the fast memory 118 if its space is needed.

FIG. 2 shows the different priorities assigned to the blocks 220 with various shading. In one embodiment, a block 220 with high priority may therefore not get removed if a block 220 with lower priority is available which can be removed instead. Removal of blocks ensures that enough space exists in the fast memory 118 to hold incoming blocks from the slower memory 202. In one embodiment, scan processes 208 determine which priority is assigned to a page control via calls 212 to the caching subsystem.

In one embodiment, every time a scan 208 releases a block, it marks the block with a priority as discussed above. The priority has the purpose of retaining blocks between the leader and trailer of a group in the fast memory 118. In other words, the leader of a group marks blocks with a high priority, while the trailer of a group marks the block with a lower priority, such that it will get discarded soon. Each time a scan changes its location and notifies the scan group manager 22 of location change, a new block priority is computed based on the scan's relative location within its group.

FIG. 2 also shows a scan manager 222 that, in one embodiment, monitors each of the scan processes 208 in the system 102. In one embodiment, the scan processes 208 are communicatively coupled to the scan manager 222. The scan processes 208, in one embodiment, communicate with the scan manager 222 prior to, during, and after performing its scanning process. For example, when a scan process 208 wants to begin a new scan, the scan manager 222 determines a starting location for the scanning process 208. The scan manager 222, determines a starting location, in one embodiment, based on locations and statistics of other ongoing scans it is monitoring. As discussed above, a new scan can start in the middle of a table and read sequentially the next blocks until the end of the table. The scan then wraps around to the beginning of the table and continues to scan until it reaches the location where it started. The process of determining a scan start location is discussed in greater detail below.

The scan manager 222 also monitors for scan location changes. For example, the scan manager 222, in one embodiment, receives scan location information from the various scan process 208 in the system 102. The scan manager 222 records the scan location change and regroups the scan processes 208 if necessary. The scan manager 222 also updates any statistical information being recorded for the scan processes 208 or scan groups that are affected by the scan location changes. The scan location and scan group updating are discussed in more detail below. The scan processes 208, in one embodiment, assign different weights such as priorities to a block in a table where the scan process 208 is currently scanning. The priorities, in one embodiment, are assigned based on the location of the scanning process 208 within its scanning group. The priority assigning process is discussed in more detail below. Once a scan process is completed, the scan manager 222 can remove a scan and its associated information from a scanning group.

The scan manager 222, in one embodiment, also provides an interface to scan processes 208 for requesting a "start new scan" process, an "update scan location" process, a "get priority of current block" process, and an "end scan" process. For example, a scan process 208 can call "start new scan" process at the beginning of a scan in order to obtain the start location (which can be in the middle of a table). The "update scan location" process can be called periodically when the scan location changes (e.g., it may be called after every 100 pages/blocks read and processed). It should be noted that this process may also be called in different intervals. For example, the frequency with which this method is called may be made dependent on the speed of a scan or other factors. The "get priority for current block" process can be called periodically to determine the priority with which blocks/pages are marked in the cache fast memory 118 after they have been processed.

For example, the priority may be checked at every 500 pages/blocks and then stored and used until the next call to that method. Similar to the previous process, this process may also be called in a more dynamically determined way, e.g., dependent on the scan speed. Finally, the "end scan" process can be called when a scan reaches its starting location again and the scan process is about to end. It should be noted that names of these processes are only used for illustrative purposes.

Management of Scan Processes

Figure 3:
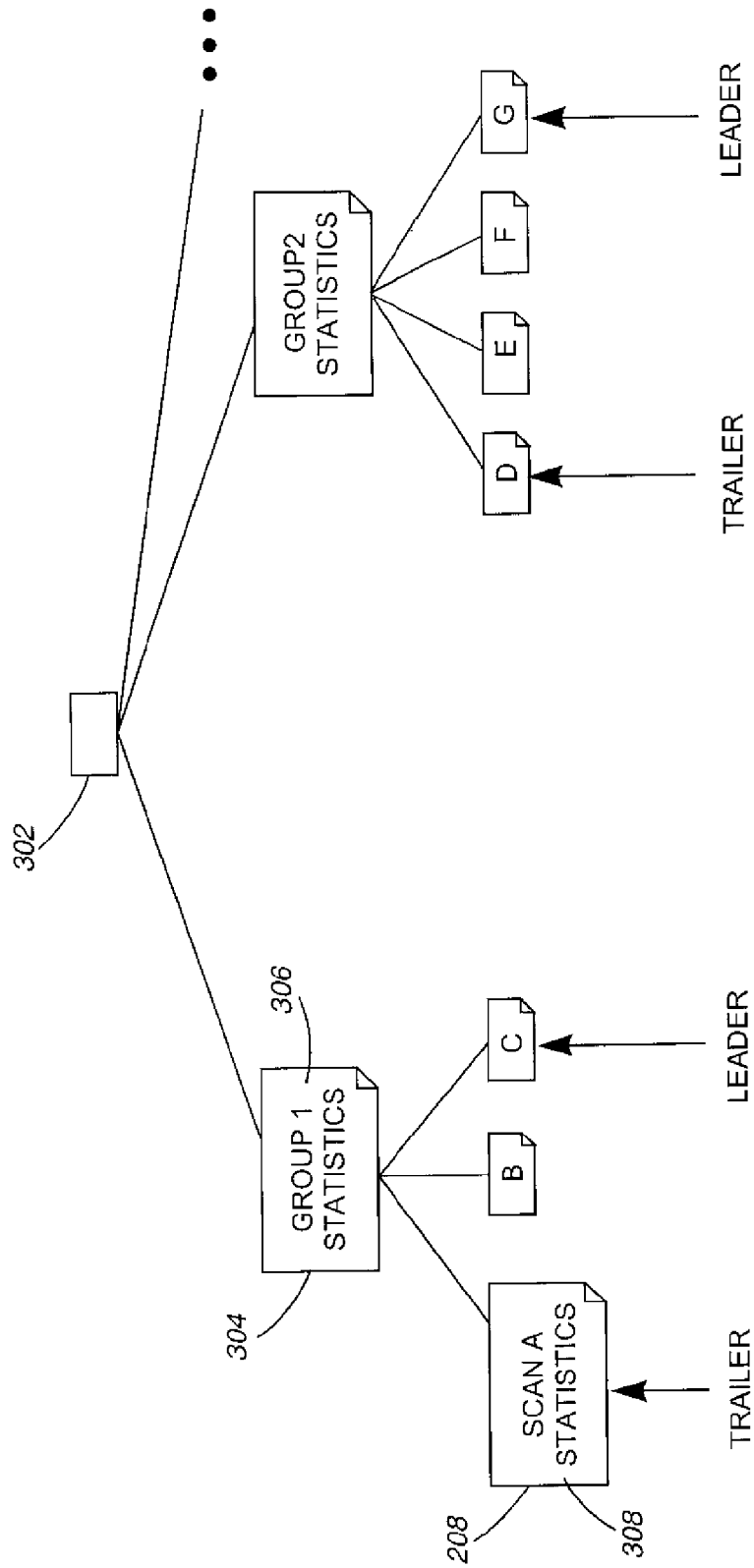
FIG. 3 illustrates one example a data structure according to an embodiment of the present invention.

In one embodiment, the scan group management structure keeps track of ongoing table scans 208, their locations and other statistics in one or more data structures 224. FIG. 2 shows the data structure as a hierarchical tree-like structure and FIG. 3 shows a more detailed view of this structure 224. It should be noted that a hierarchical tree structure is only one example of how the scan manager 222 can organize and represent multiple table scan processes 208. The hierarchical tree 224 of FIG. 3 includes a root node 302 that points to zero or more group nodes 304. Each group node, in one embodiment, represents a set of ongoing scans. A group node 304 can also store statistics 306 associated with the group such as average speed (blocks/s), age of the group, and the like. In addition, a group node 304 can reference all scans 208 that are members of this group. The scans 208, in one embodiment, are sorted by their location, with the front-most scan marked as "leader" and the scan at the end of the group marked as "trailer". Each scan node 208 can also store scan-specific statistics 308 such as speed, age, and the like.

In one embodiment, each group 304 represents a set of contiguous pages or blocks that are assumed to be in the fast memory 118. In other words, the leader of a group 304 is reading the page or block into fast memory 118, while the trailer is discarding it from the fast memory 118. All scans 208 in the group 304 can then share the content of the page or block and thereby costly transfers from slow memory 202 to fast memory 118 are reduced. As discussed above, leaders, trailers, and middle scans, in one embodiment, can modify the priority of cached pages or blocks in order to achieve this load/store/discard behavior. Therefore, in one embodiment, the sum of all pages/blocks of all groups is less than or equal to the available cache space. It should be noted that the presented data structure 224 is a logical structure and data structures other than a hierarchical tree can be used.

Overall Process for Managing Multiple Table Scan Processes

Figure 4:
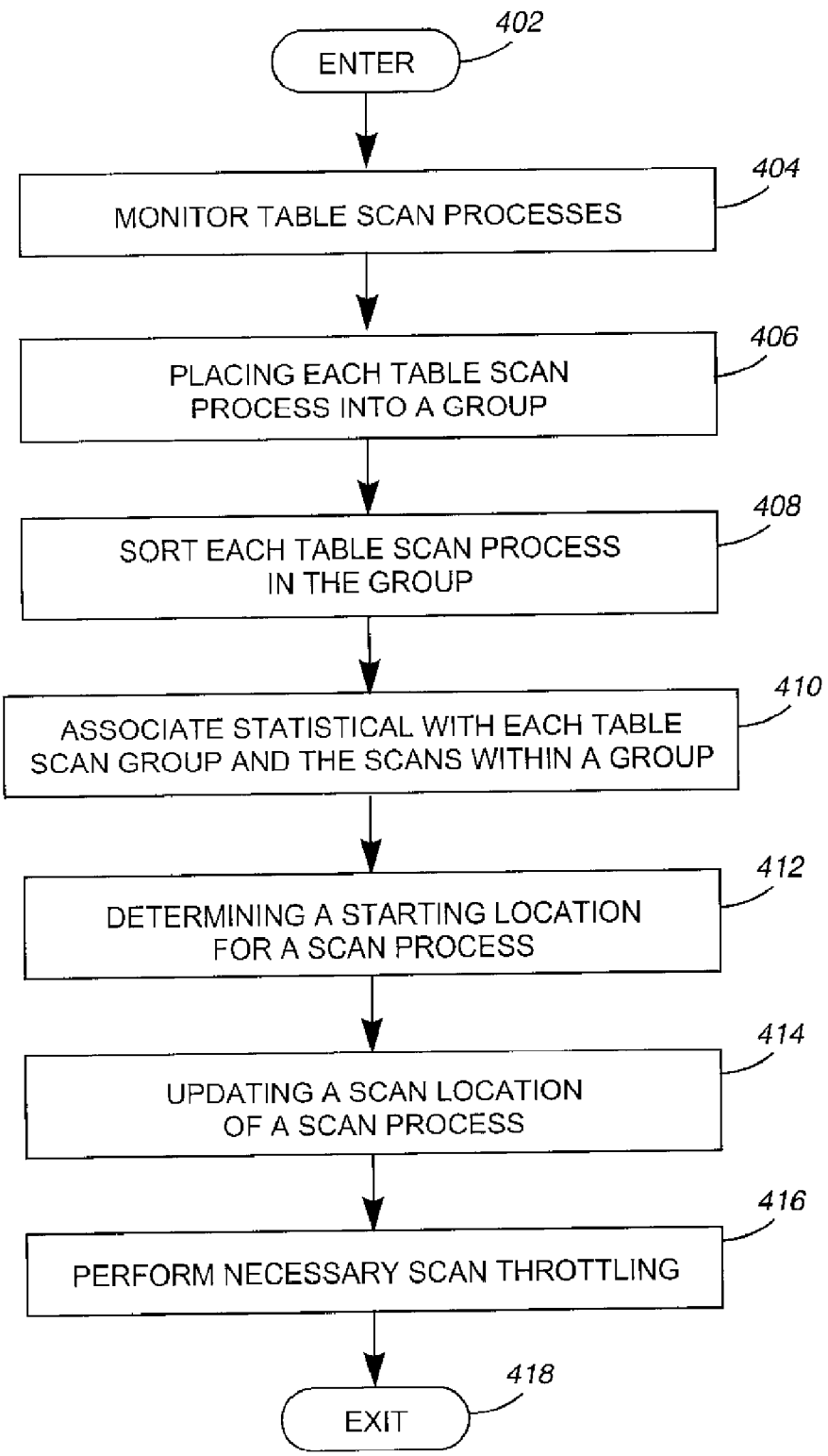
FIG. 4 is an operational flow diagram illustrating an exemplary overall process of the present invention according to an embodiment of the present invention.

FIG. 4 is an operational diagram illustrating an overall process for managing multiple table scan processes. The operational diagram of FIG. 4 begins at step 402 and flows directly to step 404. The table scan manager 222, at step 404, monitors table scan processes 208. Each table scan process 208, at step 406, is placed in to a table scan group. The table scan manager 222, at step 408, sorts each table scan processes 208 within its scan group. The table scan manager 222, at step 410, also associates statistical information with each table scan group and the scans within a scan group. A starting location, at step 412, for one or more table scan processes 208 is determined by the table scan manager 222. If any updates have been received, the table scan manager 222, at step 414, updates a scan location for one more table scan processes 208. The table scan manager 222, at step 416, also performs any necessary scan throttling. The control flow exits at step 418.

Exemplary Process for Determining a Starting Location for a Scan Process

Figure 5:
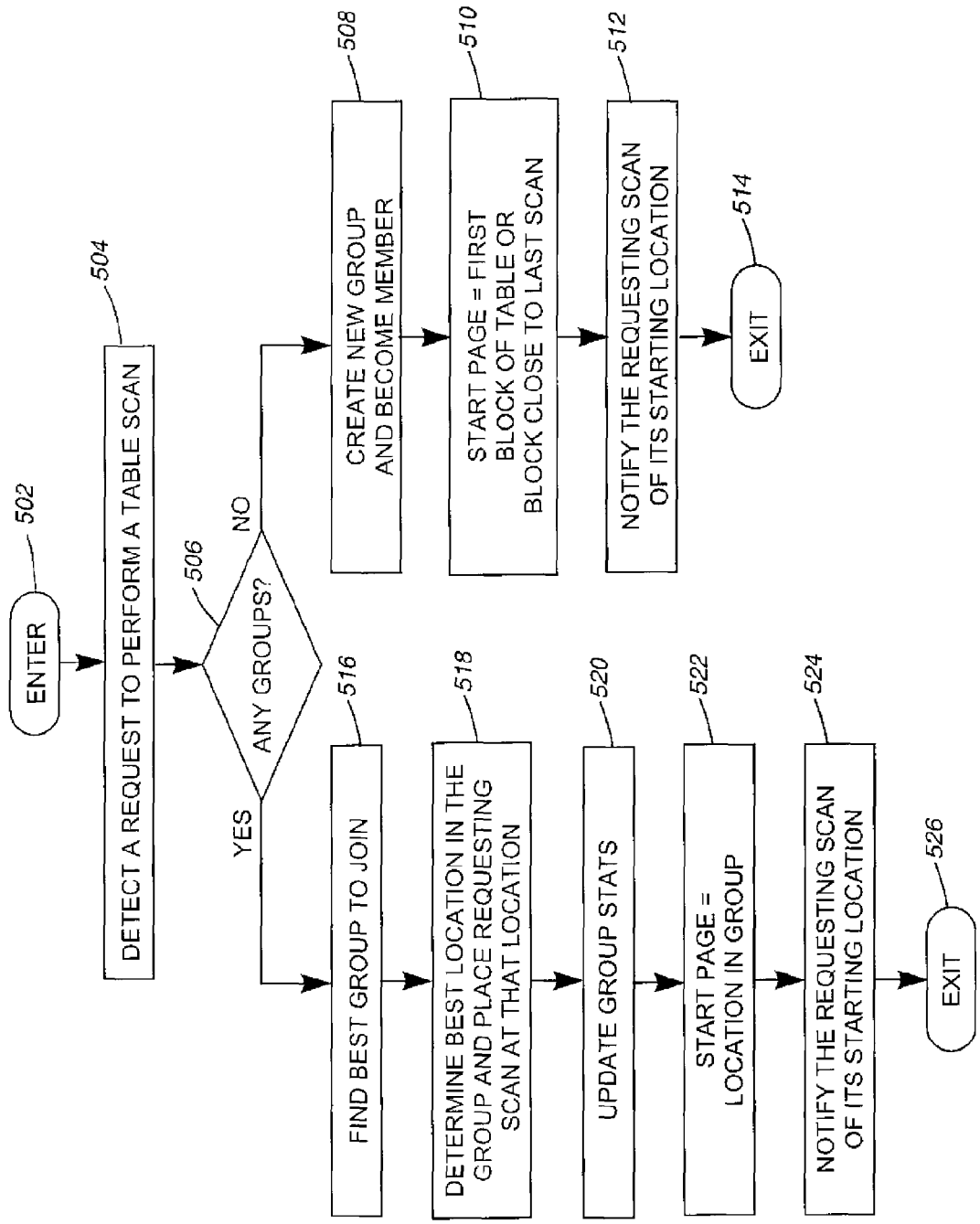
FIG. 5 is an operational flow diagram illustrating an exemplary process of starting a new table scan process according to an embodiment of the present invention.

FIG. 5 is an operational diagram illustrating an exemplary process of determining a starting location for a scan process 208. The operational flow diagram of FIG. 5 begins at step 502 and flows directly to step 504. The scan manager 222, at step 504, detects a request to perform a table scan. For example, a scan process 208 can contact the scan manager 222 to retrieve a starting location. The scan manager, at step 506, determines if any scan groups 304 are available. If the result of this determination is negative, the scan manager 222, at step 508, creates a new group node and places the requesting scan 208 as the group's 304 only member. The scan manager 222, at step 510, selects the beginning of the table as the starting location. However, if there was an earlier scan, the scan manager 222 can choose a location in the table near the previous scan to be the starting location.

The scan manager 222, at step 512 notifies the requesting scan 208 of its starting location. The control flow then exits at step 514. The latter is useful as previously ongoing scans leave some pages/blocks in the cache that can be reused by a new starting scan. If the result of the determination at step 506 is positive (i.e. at least one group is available), the scan manager 222, at step 516, determines the "best" group for the requesting scan to join. For example, the scan manager 222 can analyze the statistics stored with each group and based on the statistics place the requesting scan 208 in the group with lowest age, with most similar average speed, and the like.

The scan manager 222, at step 518, determines the "best" location within that group. For example, based on the statistical information associated with the group 304 such as comparing relative speeds, the scan manager 222 can determines that the requesting scan 208 should be inserted closer to the leader or closer to the trailer. After the requesting scan 208 is placed within the group 304, the scan manager 222, at step 520 updates the statistics associated with the group to reflect the new addition. The scan manager 222, at step 522, selects that starting location of the requesting scan 208 as its location within the group 304. The scan manager 222, at step 524, notifies the requesting scan 208 of its starting location. The control flow then exits at step 526.

Exemplary Process of Updating a Scan Location of a Scan Process

Figure 6:
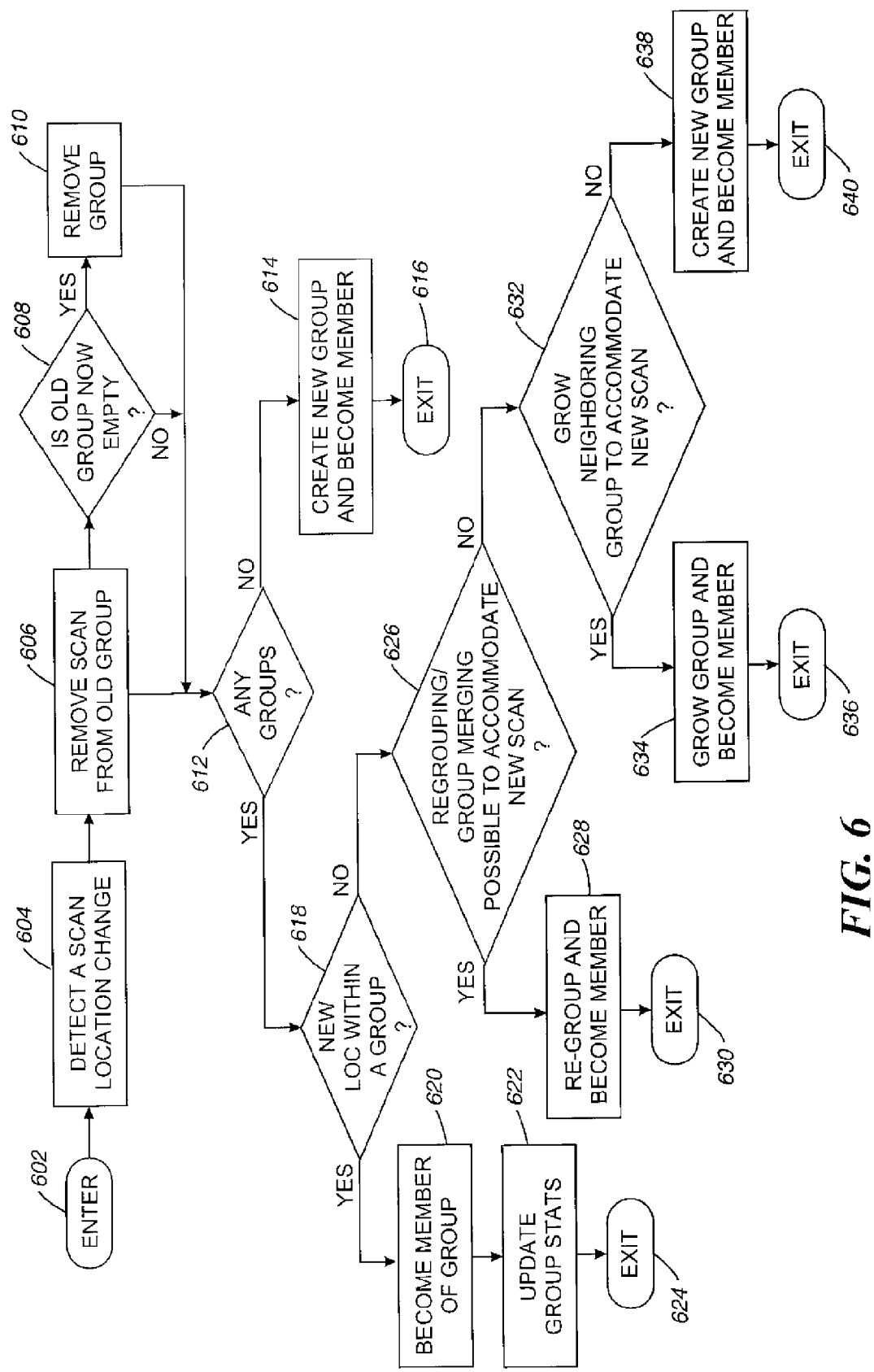
FIG. 6 is an operational flow diagram illustrating an exemplary process of updating a location of a table scan according to an embodiment of the present invention.

FIG. 6 is an operational diagram illustrating an exemplary process of updating a scan location of a scan process 208. The operational flow diagram of FIG. 6 begins at step 602 and flows directly to step 604. It should be noted that location changes can be registered every time when a scan moves to a new block or page, or they can be registered less frequently, for example, after every 10 pages read. The scan process can also choose more complex location updating intervals, as discussed above. The scan manager 222, at step 604, detects a scan location change of one or more scan processes 208. The scan manager 222, at step 606, removes the scan 208 from its current group and updates the group statistics to reflect the removal.

The scan manager 222, at step 608, determines if the old group is now empty. If the result of this determination is positive, the scan manager 222, at step 610, removes the old group. The control flows to step 612. If the result of this determination is negative, the scan manager 612 determines if one or more scan groups are available. If the result of this determination is negative, the scan manager 222, at step 614, creates a group and the scan is inserted as the only member. The control flow then exits at step 616. If the result of this determination is positive, the scan manager 222, at step 618, determines if the new scan location falls within any of those other groups, for example, between a leader and trailer. If the result of this determination is positive, the scan manager 222, at step 620, places the can as a new member of this group. The group's statistics, at step 622 are then updated to reflect the addition. The control flow then exits at step 624.

If the result of this determination is negative, the scan manager 222, at step 626, determines if a regrouping operation (discussed in greater detail below) such as splitting and merging of groups can help in accommodating the scan 208. If the result of this determination is positive, the scan manager 222, at step 628, performs the regrouping and places the scan 208 into an appropriate scan group. The control flow then exits at step 630. If the result of this determination is negative, the scan manager 222, at step 632 determines if the scan 2208 can be included in any group as a new leader or trailer, for example, by growing the group. If the result of this determination is positive, the scan manager 222, at step 634, increases the size of the group and places the scan 208 within the modified group. The control flow then exits at step 636. If the result of this determination is negative, the scan manager 222, at step 638, creates a new group and places the scan 208 in the new group as its only member. The size of a group 304, in one embodiment, may not be able to be increased because the overall number of pages represented by the grown group plus all other groups may exceed the fast memory 118 size. The control flow then exits at step 640.

Exemplary Process of Regrouping Table Scans

Figure 7:
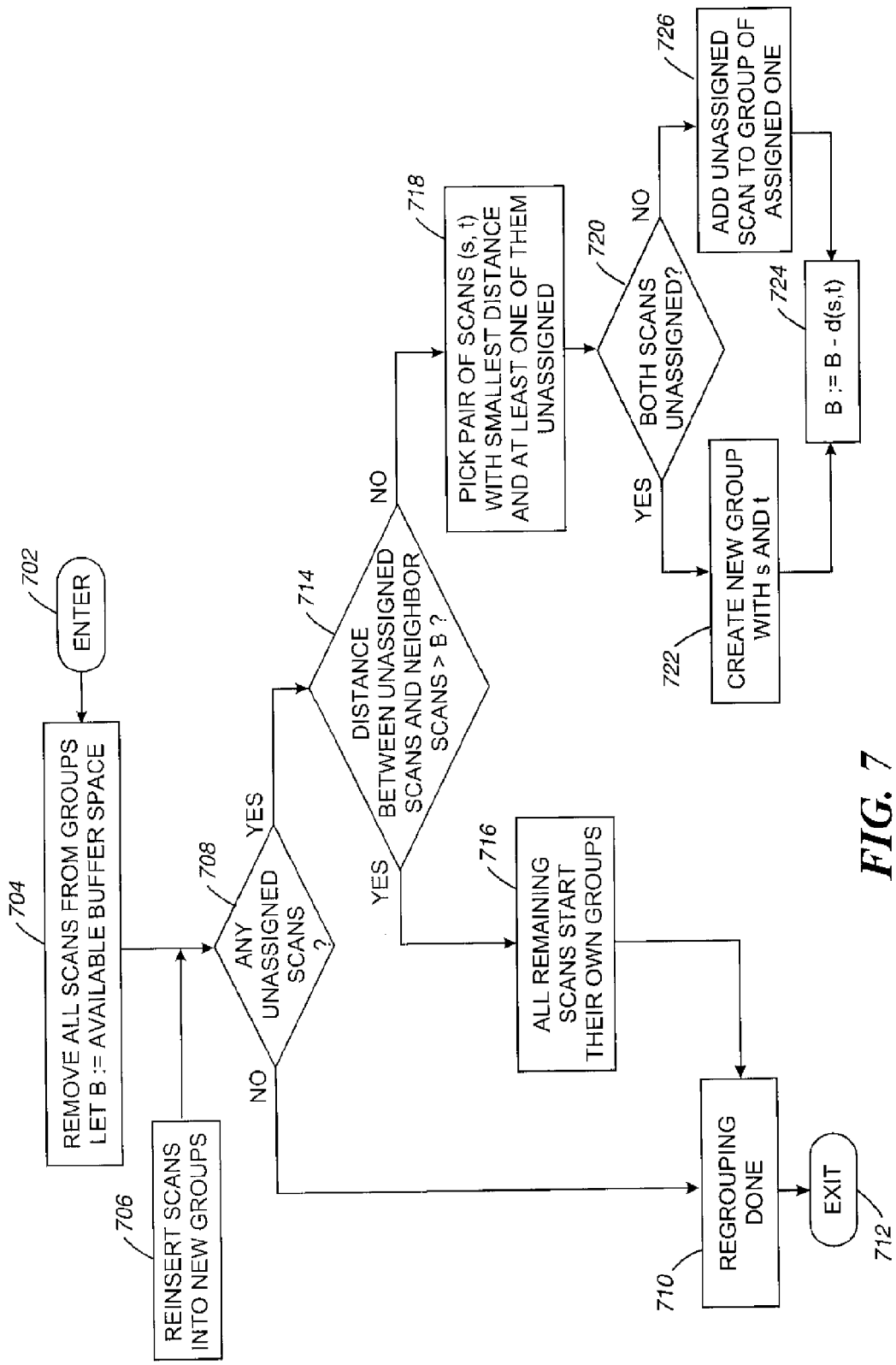
FIG. 7 is an operational flow diagram illustrating an exemplary process of regrouping a set of table scan processes according to an embodiment of the present invention.

FIG. 7 is an operational diagram illustrating an exemplary process of regrouping one or more scan processes 208. The operational flow diagram of FIG. 7 begins at step 702 and flows directly to step 704. The scan manager 222, at step 704, removes all scans from the scan groups 304 groups and the available buffer/cache space B is determined. The scan manager 222, at step 706, reinserts the scans 208 in a pair wise fashion while building up new groups incrementally. The scan manager 222, at step 708, determines if any scans 208 have been left unassigned. For example, a scan can be left unassigned during the previous steps when it cannot be added to any other groups. In other words, scans are unassigned to groups until this is no longer possible due to space constraints. The remaining scans are referred to as "unassigned scans". If The result of this determination is negative, the regrouping, at step 710, is completed and the control flow exits at step 712.

If the result of this determination is positive, the scan manager 222, at step 714. determines if the distance between any scan and its neighboring scan is less than or equal to B. It should be noted that if no such scan exists then adding any scan to some other group by growing it would cause the sum of all pages in all groups to become larger than B, the cache size. Therefore, if the result of above determination is positive, the scan manager 222, at step 716, places the remaining unassigned groups becoming their group's only member. The regrouping process is then completed and the control flow exits at step 712.

If the result of the above determination is negative, i.e. there is at least one scan that can be added without causing the number of pages/blocks to exceed the cache size B, the scan manager 222, at step 718, selects the pair (s,t) of scans with the smallest distance. The scan manager 222, at step 720, determines if both scans s and t are assigned to groups. If the result of this determination is positive, the scan manager 222, at step 722, creates a new group with s and t as members. The scan manager 222, at step 724, then reduces B by the distance between s and t in order to reflect the reduced space now available in the fast memory 118. If the result of the above determination is negative, i.e. one of scans s and t has already been assigned to a group earlier, the scan manager 222, at step 726, places the unassigned scan in the group of the assigned scan. This is accomplished, in one embodiment, by growing that group. The control then flows to step 724 where B is reduced by the distance between s and t in order to reflect the reduced space now available in the fast memory 118. The control then flows back to step 708. It should be noted that this method guarantees the best utilization of the fast memory 118 while minimizing the number of groups (and thereby the number of pages/blocks that have to be brought in and discarded).

Exemplary Process of Throttling Table Scans

Figure 8:
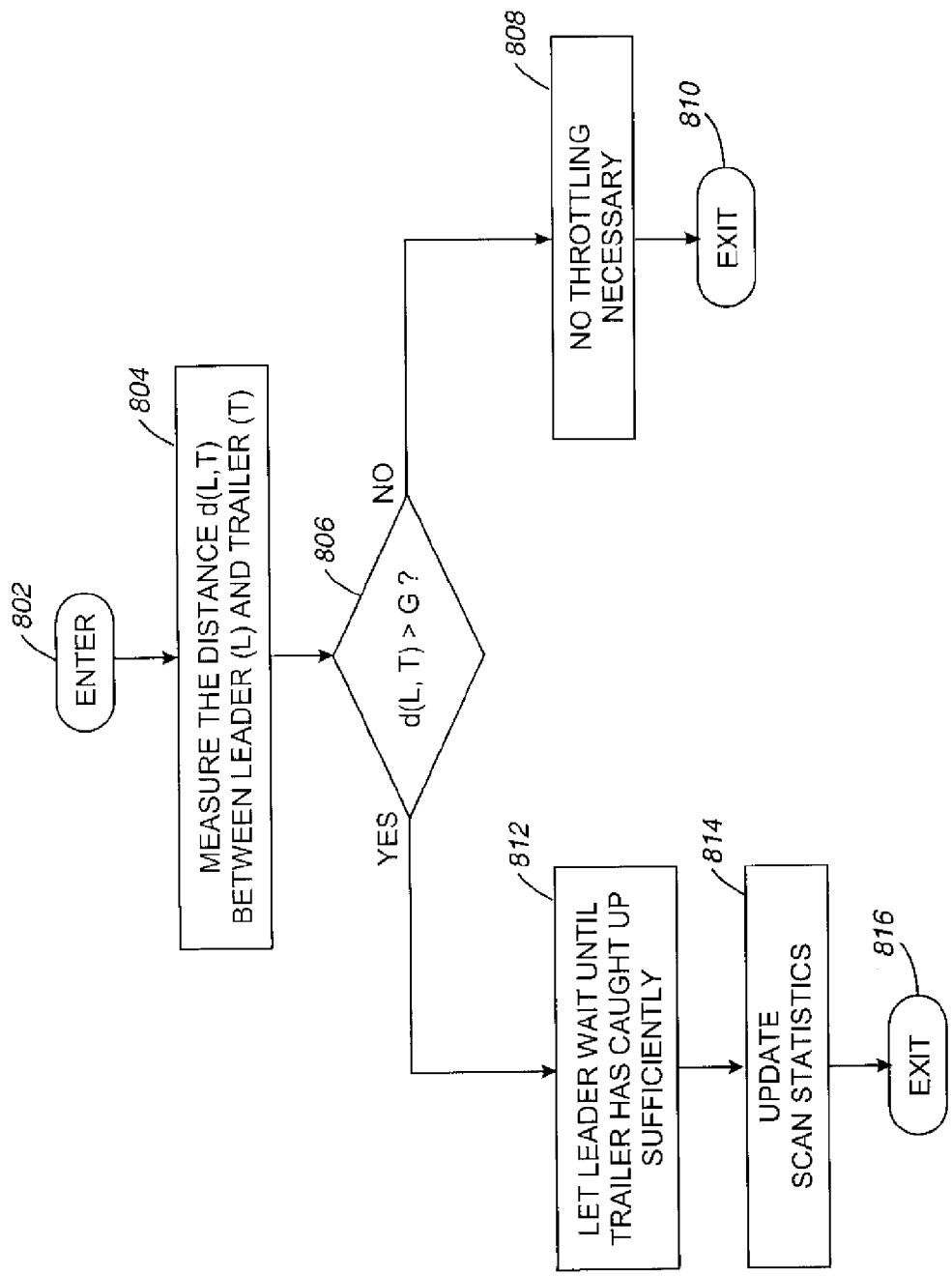
FIG. 8 is an operational flow diagram illustrating an exemplary process of throttling a table scan according to an embodiment of the present invention.

FIG. 8 is an operational diagram illustrating an exemplary process of throttling one or more scan processes 208. The operational flow diagram of FIG. 8 begins at step 802 and flows directly to step 804. Scans may have different speeds relative to each other and this speed may also change over a scan's lifetime. These difference speeds can cause a certain amount of drift between scans. In other words, faster scans move away from slower scans causing groups to become larger or eventually break up into smaller groups. In order to prevent this, the present invention performs scan throttling, which allows faster scans to be slowed down (within limits). This "throttling" allows slower scans to catch up and thereby prevent groups from breaking apart. In one embodiment throttling uses statistics on the speeds of other scans and information on the scan locations and is triggered whenever the leader of a group changes its position.

The scan manager 222, at step 804, determines the distance d(L,T) between the leader and the trailer. In one embodiment, this is achieved via the location information of the scans. The scan manager 222, at step 706, determines if the distance is greater than the allowed size of a group G. In one embodiment, this size G can be defined as the cache size divided by the number of groups. If the result of this determination is negative, i.e. the distance is not greater, the scan manager 222, at step 808, determines that throttling is not necessary. The control flow then exits at step 810. If the result of this determination is positive, i.e. the distance is greater, the scan manager 222, at step 812, notifies the leader to wait until the distance between the leader and the trailer is below a given threshold. While it is sufficient for the distance to be less than or equal G, longer waits may achieve even smaller group sizes.

In general, the exact wait time is calculated from the estimated or previously observed speeds of the trailer, leader, and other scans in the group. For example, if the trailer has a speed of 10 pages/s, the leader has to wait for 5 seconds in order for the trailer to get 50 pages closer. The scan manager, at step 814, updates the statistics associated with the leader and normal scan operation resumes. The statistics of a scan may include information on how long that scan has been throttled so far. If a scan was throttled more than some predefined threshold, it may be excluded from throttling. This is useful to prevent scans that are faster than most other scans from being delayed unnecessarily. It should be noted that, in one embodiment, this framework hides the throttling from the remaining scan logic. Scan processes call the "update scan location" method which performs the throttling. In other words, throttling looks like a longer running method to the caller and therefore the scan process logic can be used as is. The control flow then exits at step 816.

Exemplary Process Performing a Table Scan

Figure 9:
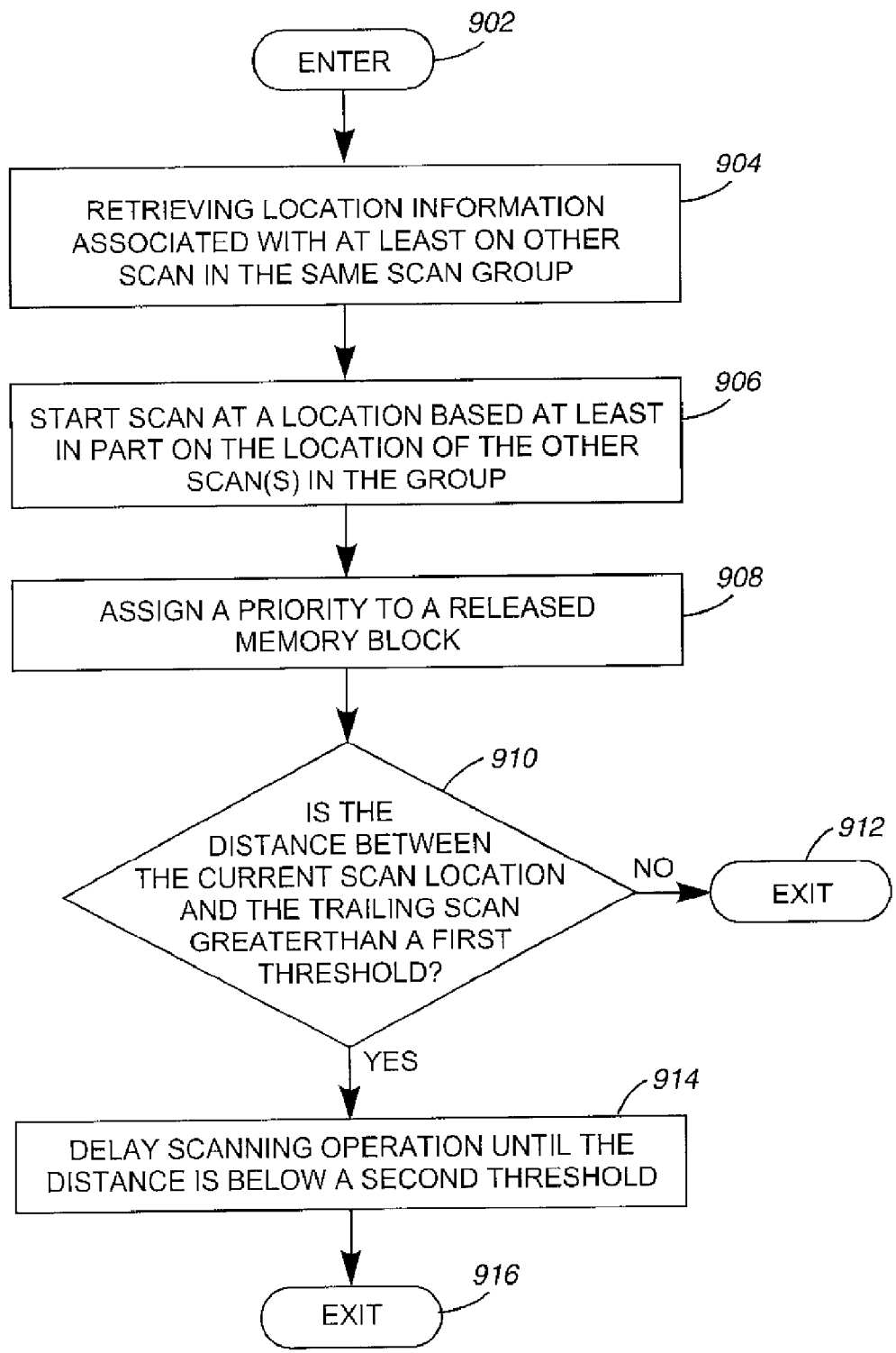
FIG. 9 is an operational flow diagram illustrating an exemplary process of performing a table scan operation according to an embodiment of the present invention.

FIG. 9 is an operational diagram illustrating an exemplary process of performing a table scan operation. The operational flow diagram of FIG. 9 begins at step 902 and flows directly to step 904. A table scan process 208, at step 904, retrieves location information that is associated with at least one other table scan in its scan group. The table scan process 208, at step 906, starts a scan at a location within a storage medium table based at least in part on the location of the other scan(s) in the scan group. The table scan process 208, at step 908, assigns a priority weight to a released memory block. The table scan process, at step 910, determines if the distance between it and a trailing scan is greater than a first given threshold. If the result of this determination is negative, the control flow exits at step 912. If the result of this determination is positive, the table scan process 208, at step 914, delays its scanning process until the distance is below a second threshold. The control flow then exits at step 916.

Information Processing System

Figure 10:
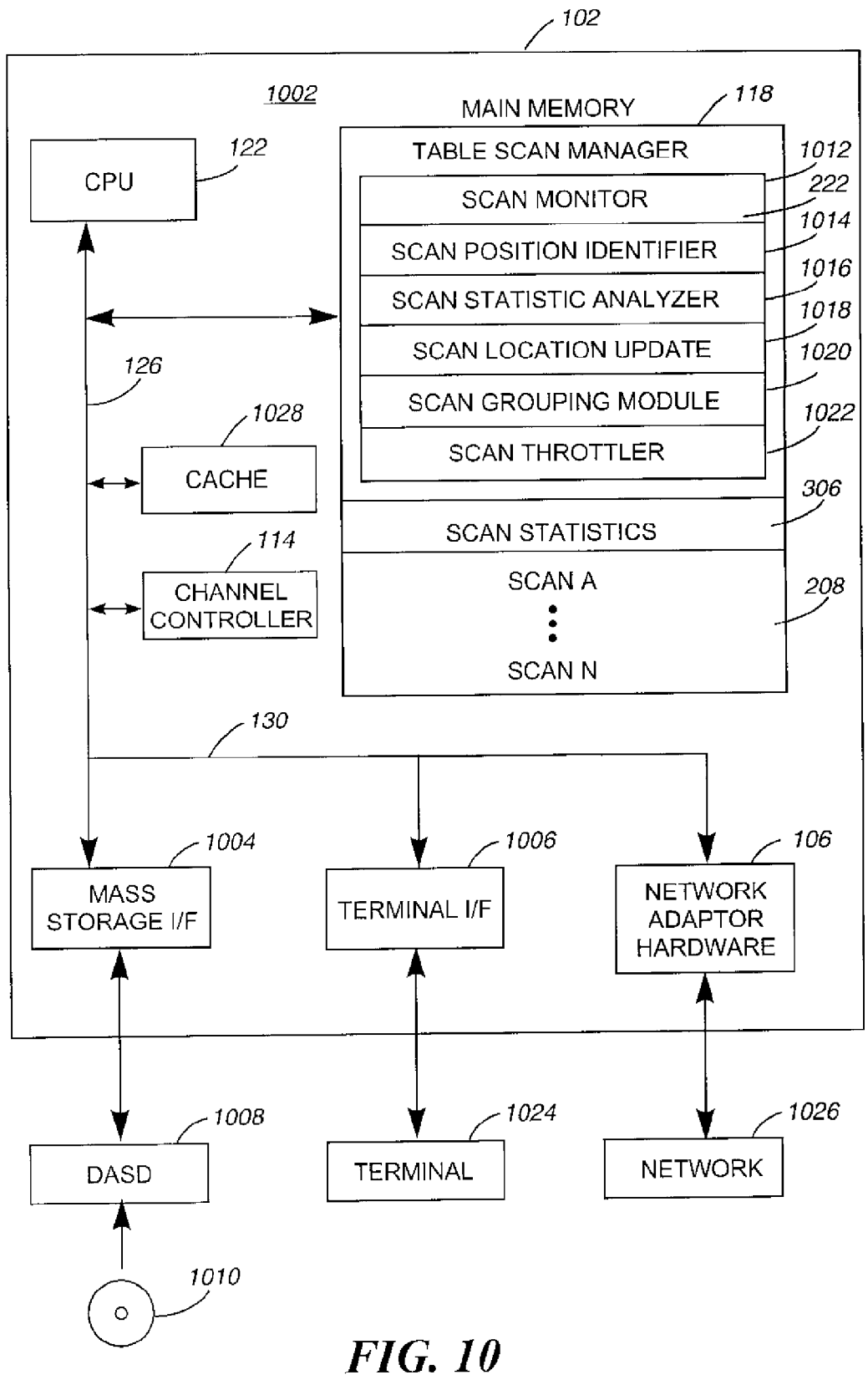
FIG. 10 is a more detailed view of the processing nodes of FIG. 1 according to an embodiment of the present invention.

FIG. 10 is a block diagram illustrating a more detailed view of the processing node 102 of FIG. 1, which from hereon in is referred to as information processing system 102. The following discussion is also applicable to the processing node 102. The information processing system 102 is based upon a suitably configured processing system adapted to implement the exemplary embodiment of the present invention. Any suitably configured processing system is similarly able to be used as the information processing system 102 by embodiments of the present invention, for example, a personal computer, workstation, or the like. The information processing system 102 includes a computer 1002. The computer 1002 includes a processor 122, main memory 118, and a channel controller 114 on a system bus. In one embodiment, the computer 1002 also includes one or more caches 1028, registers, or the like. A system input/output bus 130 couples a mass storage interface 1004, a terminal interface 1006 and a network hardware 106. The mass storage interface 1004 is used to connect mass storage devices such as data storage device 1008 to the information processing system 102. One specific type of data storage device is a computer readable medium such as a CD drive or DVD drive, which may be used to store data to and read data from a CD 1010 (or DVD). Another type of data storage device is a data storage device configured to support, for example, NTFS type file system operations.

The main memory 118, in one embodiment, includes the table scan manager 222, plurality of scan processes 208, and scan statistics 306 (and/or 308). In one embodiment, as discussed above, the scan statistics 306 are associated with a group of scan and/or individual scans 208. The scan manager 222, in one embodiment, includes a scan monitor 1012 for monitoring scans as discussed above. A scan position identifier 1014, in one embodiment, determines the starting location of a scan. A scan statistic analyzer 1016, in one embodiment, analyzes the scan statistics 306 for use in determining how to regroup scan, determining a staring location and the like, as discussed above. The main memory also includes a scan location updater 1018 that receives scan location information from scans and updates their scanning location, as discussed above. A scan group module 1020, in one embodiment, places scans into scan groups and also regroups scans when needed, as discussed above. A scan throttler 1022, determines when a scan should be throttled, as discussed above.

Although only one CPU 122 is illustrated for computer 1002, computer systems with multiple CPUs can be used equally effectively. Embodiments of the present invention further incorporate interfaces that each includes separate, fully programmed microprocessors that are used to off-load processing from the CPU 122. The terminal interface 1006 is used to directly connect the information processing system 102 with one or more terminals 1024 to the information processing system 102 for providing a user interface to the computer 1002. These terminals 1024, which are able to be non-intelligent or fully programmable workstations, are used to allow system administrators and users to communicate with the information processing system 102. A terminal 1024 is also able to consist of user interface and peripheral devices that are connected to computer 1002.

An operating system image (not shown) included in the main memory 118 is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 102. The network adapter hardware 106 is used to provide an interface to a network 1026 such as a wireless network, WLAN, LAN, or the like. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via a CD/DVD, e.g. CD 1010, or other form of recordable media, or via any type of electronic transmission mechanism.

Non-Limiting Examples

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method on an information processing system comprising:
    retrieving at least a current scanning location within a storage medium table associated with at least a first storage medium table scan that is executing;
    starting a second storage medium table scan at a location within the storage medium table, wherein the location where the second storage medium table scan is started is based on at least the current scanning location of the first storage medium table scan within the storage medium table, wherein the second storage medium table scan is started while the at least first storage medium table scan is scanning the storage medium table, and wherein in response to being started at the location the first storage medium table scan and the second storage medium table scan share storage medium table pages that the first storage medium table scan has brought into fast memory;
    assigning a weight to at least one storage medium block within the storage medium table based on at least a current scanning location within the storage medium table relative to the location of the first storage medium table scan;
    determining if a distance between the current scanning location and the location of the first storage medium table scan is greater than a first given threshold; and
    throttling down, in response to the distance being greater than the given threshold, a current scanning operation until the distance is below a second given threshold.

2. The method of claim 1, wherein the assigning the weight to the at least one storage medium block, further comprises:
    notifying a table scan managing module of a current scan location change;
    receiving a weight value from the scan managing module to assign to the storage medium block.

3. The method of claim 2, wherein the notifying is performed at a given intervals of time.

4. The method of claim 1, wherein the determining the distance, further comprises:
    retrieving current scan location information associated with the first storage medium table scan.

5. The method of claim of claim 1, further comprising:
    determining if a current scanning operation has been previously delayed for more than a third given threshold; and
    preventing, in response to the current scanning operation being previously delayed for more than the third given threshold, the current scanning operation from being throttled back.

6. An information processing system comprising:
    a memory;
    a processor communicatively coupled to the memory;
    a storage medium table scan module communicatively coupled to the memory and the processor, the storage medium table scan module for:
        retrieving at least a current scanning location within a storage medium table associated with at least a first storage medium table scan that is executing;
        starting a second storage medium table scan at a location within the storage medium table, wherein the location where the second storage medium table scan is started is based on at least the current scanning location of the first storage medium table scan within the storage medium table, wherein the second storage medium table scan is started while the at least first storage medium table scan is scanning the storage medium table; and
        assigning a weight to at least one storage medium block within the storage medium table based on at least a current scanning location within the storage medium table relative to the location of the first storage medium table scan;
    assigning a weight to at least one storage medium block within the storage medium table based on at least a current scanning location within the storage medium table relative to the location of the first storage medium table scan;
    determining if a distance between the current scanning location and the location of the first storage medium table scan is greater than a first given threshold; and throttling down, in response to the distance being greater than the given threshold, a current scanning operation until the distance is below a second given threshold.

7. The information processing system of claim 6, wherein the assigning the weight to the at least one storage medium block, further comprises:
   notifying a table scan managing module of a current scan location change;
   receiving a weight value from the scan managing module to assign to the storage medium block.

8. The information processing system of claim 7, wherein the notifying is performed at a given intervals of time.

9. The information processing system of claim 6, further comprises:
   retrieving current scan location information associated with the first storage medium table scan in order to determine if the distance is greater than the first given threshold.

10. The information processing system of claim 6, wherein the storage medium table scan module is further for:
    determining if a current scanning operation has been previously delayed for more than a third given threshold; and
    preventing, in response to the current scanning operation being previously delayed for more than the third given threshold, the current scanning operation from being throttled back.

11. A non-transitory computer readable medium comprising instructions for:
    retrieving at least a current scanning location within a storage medium table associated with at least a first storage medium table scan that is executing;
    starting a second storage medium table scan at a location within the storage medium table, wherein the location where the second storage medium table scan is started is based on at least the current scanning location of the first storage medium table scan within the storage medium table, wherein the second storage medium table scan is started while the at least first storage medium table scan is scanning the storage medium table; and
    determining if a distance between the current scanning location and the location of the first storage medium table scan is greater than a first given threshold;
    assigning a weight to at least one storage medium block within the storage medium table based on at least a current scanning location within the storage medium table relative to the location of the first storage medium table scan;
    determining if a distance between the current scanning location and the location of the first storage medium table scan is greater than a first given threshold; and
    throttling down, in response to the distance being greater than the given threshold, a current scanning operation until the distance is below a second given threshold.

12. The non-transitory computer readable medium of claim 11, wherein the instructions for assigning the weight to the at least one storage medium block, further comprises instructions for:
    notifying a table scan managing module of a current scan location change; and
    receiving a weight value from the scan managing module to assign to the storage medium block.

13. The non-transitory computer readable medium of claim 12, wherein the notifying is performed at a given intervals of time.

14. The non-transitory computer readable medium of claim 11, wherein the instructions for determining the distance, further comprise instructions for:
    retrieving current scan location information associated with the first storage medium table scan.

15. The non-transitory computer readable medium of claim 11, further comprising instructions for:
    determining if a current scanning operation has been previously delayed for more than a third given threshold; and
    preventing, in response to the current scanning operation being previously delayed for more than the third given threshold, the current scanning operation from being throttled back.

* * * * *